United States Patent
Yoshida et al.

[11] Patent Number: 5,772,283
[45] Date of Patent: Jun. 30, 1998

[54] TILT-UP AUTOMOBILE SEAT

[75] Inventors: Masami Yoshida, Tochigi-ken; Tetsuya Kayumi, Saitama, both of Japan

[73] Assignees: Tokyo Seat Co., Ltd., Saitama-Ken; Honda Giken Kogyo Kabushiki Kaisha, Tokyo, both of Japan

[21] Appl. No.: 726,458

[22] Filed: Oct. 4, 1996

[30] Foreign Application Priority Data

Oct. 8, 1995 [JP] Japan ................................ 7-286430
Sep. 25, 1996 [JP] Japan ................................ 8-274017

[51] Int. Cl.$^6$ ........................................................ A47C 7/02
[52] U.S. Cl. ................ 297/452.38; 297/316; 297/463.1; 297/463.2; 297/313; 248/421
[58] Field of Search ................. 297/452.38, 463.2, 297/313, 314, 463.1, 452.18; 248/421, 420

[56] References Cited

U.S. PATENT DOCUMENTS 3,473,776  10/1969  Costin ................................. 248/421
5,007,682   4/1991  Kuwabara et al. ............. 297/452.38
5,288,133   2/1994  Mizushima et al. ............ 297/452.38
5,605,376   2/1997  Kogai ................................... 297/316

FOREIGN PATENT DOCUMENTS 48-2194   1/1973  Japan.
6247201   9/1994  Japan ................................ 297/463.2

Primary Examiner—Peter M. Cuomo
Assistant Examiner—Anthony D. Barfield
Attorney, Agent, or Firm—Dann Dorfman Herrell and Skillman P.C.

[57] ABSTRACT

A tilt-up automobile seat having a tilt-up mechanism positioned under a seat cushion. The seat cushion and a seat back are continuously positioned in a flat plane at a predetermined angle and the whole seat is tilted upwards around a front side of the seat cushion as a fulcrum. The tilt-up mechanism is always covered by a combination of an upper cover for covering at least its upper part and an under cover for containing at least its lower part even in a tilt-up position of the whole seat, resulting in preventing the tilt-up mechanism from being seen from outside. The upper and lower covers can include flange parts overlapped to each other, having a predetermined height.

3 Claims, 11 Drawing Sheets

TILT-UP AUTOMOBILE SEAT

BACKGROUND OF THE INVENTION i) Field of the Invention

The present invention relates to an improvement of a tilt-up automobile seat having a tilt-up mechanism contained within a base cover under a seat cushion, in which the seat cushion and a seat back are continuously positioned in a flat plane at a predetermined angle, and the whole seat is tilted upwards around a front side of the seat cushion as a fulcrum.

ii) Description of the Related Arts

Conventional tilt-up automobile seats are equipped in the form of, for example, rear seats so as to ensure bedroom space in a station wagon, a camper or the like.

In such automobile seats, a bracket plate attached to a lower side part of the seat back body is coupled with another bracket plate projected upwards from a rear side part of a tilt-up mechanism through a spindle so that the tilt-up mechanism may pivotally support a seat back. Further, a reclining mechanism is mounted to the side parts of these bracket plates so as to tiltably position a seat cushion and the seat back in a flat plane at a certain slant angle.

The tilt-up mechanism is mainly constituted by a lower frame positioned on a body floor side and an upper frame positioned on a seat cushion side. These upper and lower frames are pivotally connected to each other through a pivot mounted in a front portion of the seat cushion. A pair of collapsible link arms are pivotally mounted to the rear portions of the upper and lower frames through pivots. By extending the link arms, the whole seat can be tilted upwards around the pivot of connecting the upper and lower frames as a fulcrum.

In such a tilt-up automobile seat, it is preferable to completely contain the tilt-up mechanism within a cover under the seat cushion so that the tilt-up mechanism cannot be seen from the outside when the whole seat is in a tilt-up position as well as in a normal position.

However, when the cover is of covering the whole tilt-up mechanism from its upper side, the cover is tilted upwards along with the upper frame, and the lower part of the tilt-up mechanism can be exposed to the outside in the tilt-up position of the whole seat. On the other hand, when the cover is to contain the whole tilt-up mechanism from its lower side, as the tilt-up mechanism is operated to tilt the whole seat upwards, the cover is not moved upwards and the upper part of the tilt-up mechanism can be exposed to the outside in the tilt-up position of the whole seat.

SUMMARY OF THE INVENTION

It is therefore an object of the present invention to provide a tilt-up automobile seat having a tilt-up mechanism positioned under a seat cushion and a base cover for always covering the whole tilt-up mechanism so that the tilt-up mechanism cannot be seen from outside even when the whole seat is tilted upwards.

In accordance with one aspect of the present invention, there is provided a tilt-up automobile seat having a tilt-up mechanism positioned under a seat cushion, in which the seat cushion and a seat back are continuously positioned in a flat plane at a predetermined angle, and a whole seat is tiltable upwards around a front side of the seat cushion as a fulcrum, comprising an upper cover for covering at least an upper part of the tilt-up mechanism; and an under cover for containing at least a lower part of the tilt-up mechanism, the whole tilt-up mechanism being always covered by a combination of the upper and under covers.

In the tilt-up automobile seat of the present invention, preferably, the upper cover includes first flange parts having a first predetermined height, and the under cover includes second flange parts having a second predetermined height. The first flange parts and the second flange parts are always overlapped to each other so as to cover the tilt-up mechanism by a combination of the upper and lower covers even in a tilt-up position of the whole seat.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

The present invention will now be described in connection with its preferred embodiments with reference to the accompanying drawings.

Figure 1:
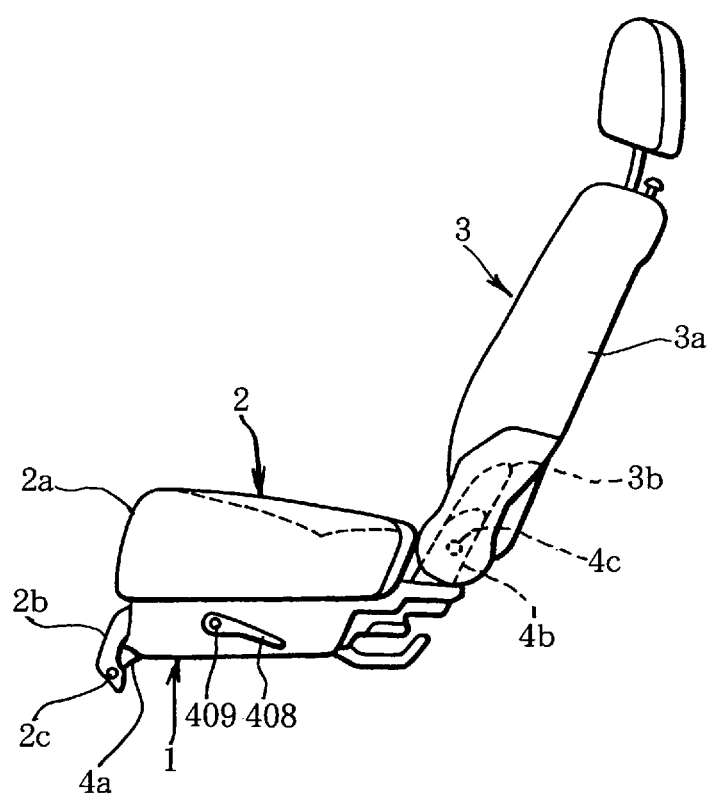
FIG. 1 is a side view showing a basic construction of a tilt-up automobile seat according to the present invention in a normal position of a whole seat.

FIG. 1 shows a tilt-up automobile seat according to the present invention in the form of each of rear seats having a basic construction in a normal position. This rear seat is collapsibly assembled from a base cover 1 as a base for containing the tilt-up mechanism 4 therein, a seat cushion 2 and a seat back 3, as hereinafter described in detail.

The seat cushion 2 includes a seat cushion body 2a which is mounted on a cover of the base cover 1. Bracket arms 2b attached on the front side portions of the seat cushion body 2a are pivotally connected to a frame part 4a positioned in the front side portion of the tilt-up mechanism 4 through a spindle 2c so that the seat cushion 2 may be pivoted upwards around the spindle 2c away from the base cover 1.

The seat back 3 includes a seat back body 3a and a bracket plate 3b attached to a lower side part of the seat back body 3a, and bracket plate 3b is coupled with a bracket plate 4b projected upwards from a rear side part of the tilt-up mechanism 4 through a spindle 4c so that the tilt-up mechanism 4 may pivotally support the seat back 3. Further, an unshown reclining mechanism is mounted to the side parts of the bracket plates 3b and 4b so as to tilt down the seat back 3 frontwards or rearwards.

Figure 2:
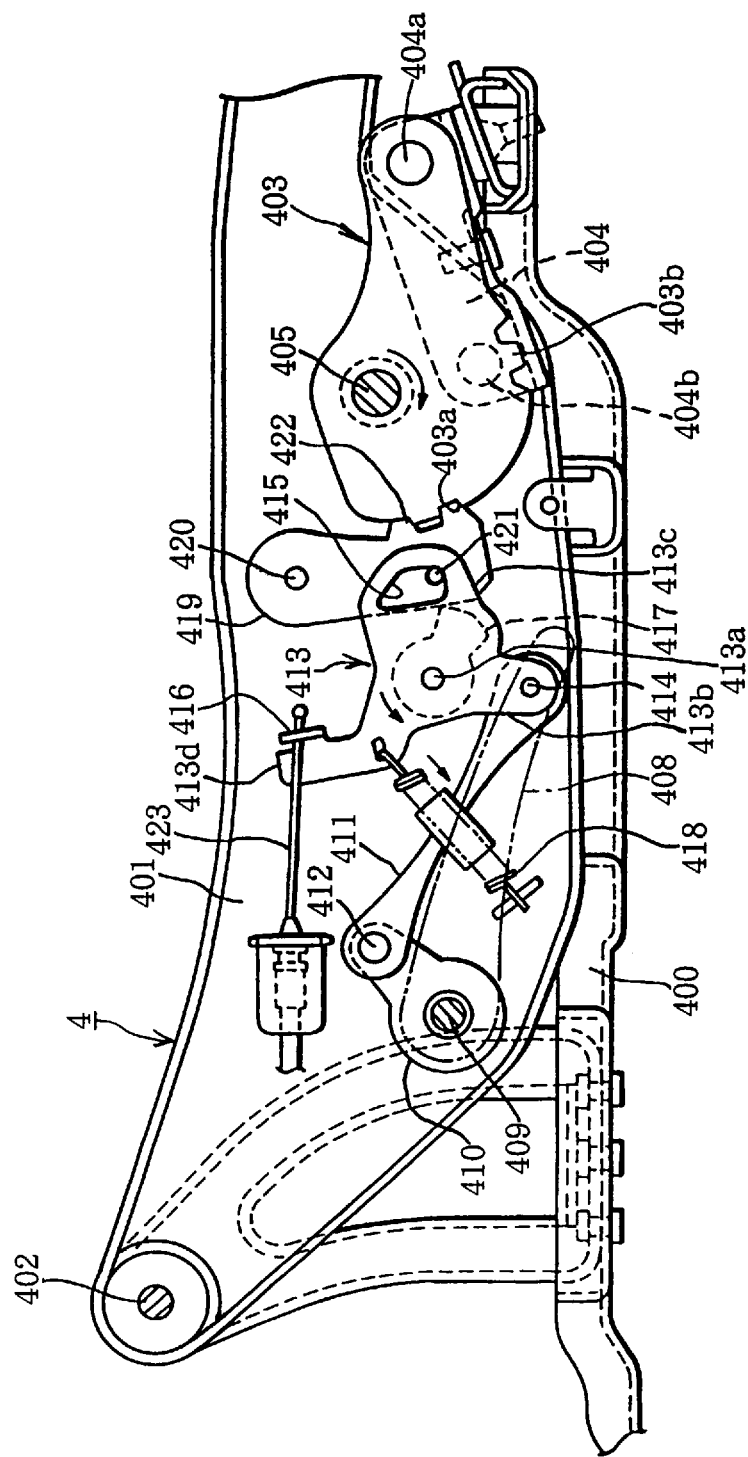
FIG. 2 is a side view showing an essential part of a tilt-up mechanism equipped in the automobile seat of the present invention in the normal position of the whole seat.
Figure 3:
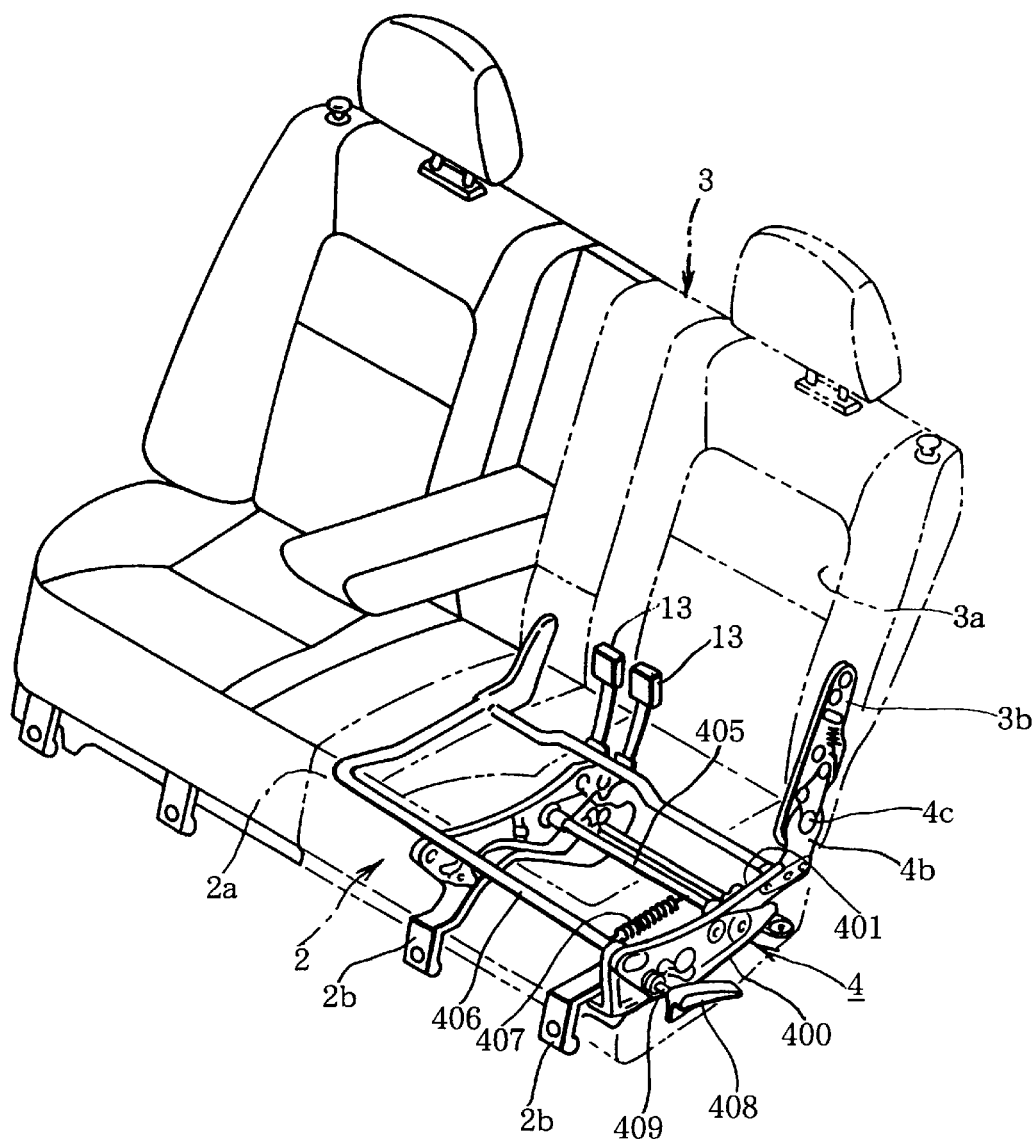
FIG. 3 is a perspective view of the automobile seat of the present invention, seen from its front side, equipped with the tilt-up mechanism shown in FIG. 2.
Figure 4:
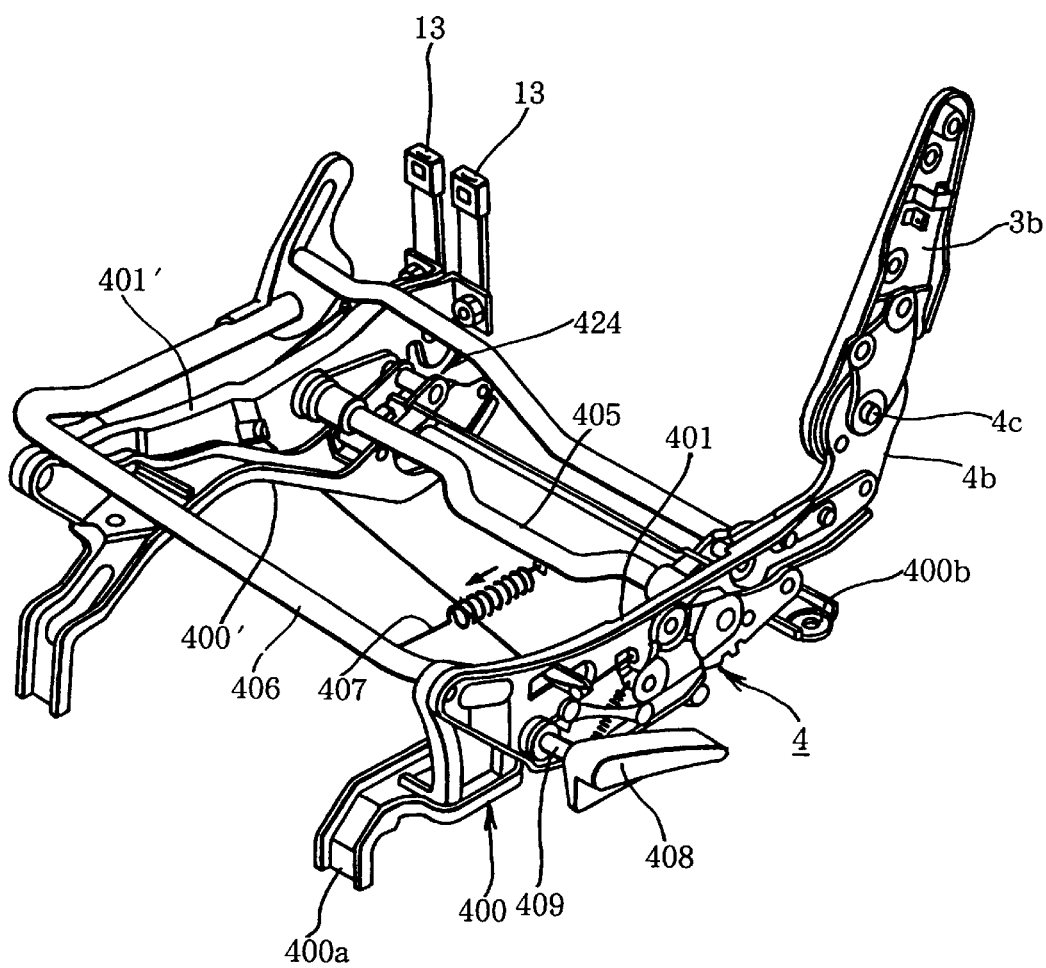
FIG. 4 is a perspective view showing the tilt-up mechanism shown in FIG. 3.

The tilt-up mechanism 4, as shown in FIG. 2, is mainly constituted by a lower frame 400 positioned on a body floor side and an upper frame 401 positioned on the seat cushion side. As shown in FIGS. 3 and 4, referring now to the right hand side rear seat shown in FIG. 3, a lower frame 400' and an upper frame 401' are further mounted on the opposite side of the rear seat in the same manner as the lower and upper frames 400 and 401. The upper frame 401 is pivotally connected to the lower frame 400 through a pivot 402 so that the upper frame 401 may pivot upwards around the pivot 402 as a fulcrum so as to tilt up the upper frame 401 away from the lower frame 400.

A pair of foldable upper and lower link arms 403 and 404 (in a folded position in FIG. 2), coupled with each other by a pivot 404a, are pivotally mounted to the rear portions of the upper and lower frames 401 and 400 through an axle 405 and a pivot 404b, respectively. Another pair of foldable link arms (not shown) are mounted to the upper and lower frames 401' and 400' in the same manner as the link arms 403 and 404, as shown in FIGS. 3 and 4. The upper link arm 403 is provided with first and second tooth parts 403a and 403b at a certain spacing in its periphery.

In the folded or extended position of the foldable link arms 403 and 404, a teeth part 422 of a stopper 419 is engaged with the first or second tooth part 403a or 403b of the upper link arm 403, as hereinafter described. The axle 405 is stretched between the upper link arms 403. Between the upper link arm 403 and a pipe frame 406 extended in the front portions of the upper frames 401 and 401', a coil spring 407 is stretched. The coil spring 407 biases the axle 405 in the direction indicated by an arrow.

More specifically, as shown in FIGS. 1, 3 and 4, the tilt-up mechanism 4 further includes an adjustment knob 408. This adjustment knob 408 is supported by an operating shaft 409 pivotally mounted on the upper frame 401, as shown in FIG. 2. The operating shaft 409 is connected to the bottom portion of an eccentric plate 410 whose top portion is pivotally coupled with one end of a connecting rod 411 through a pivot 412. The other end of the connecting rod 411 is pivotally coupled with a lower arm part 413b of an actuating member 413.

The actuating member 413 is pivotally mounted on the upper frame 401 through a spindle 413a projecting from the upper frame 401 through the central portion of the actuating member 413. This actuating member 413 has a Y-shaped plate member having three radially projected portions such as the lower arm part 413b linked to the connecting rod 411, a plate-form part 413c and an upper arm part 413d.

The plate-form part 413c of the actuating member 413 is provided with a guide opening 415 through which a guide pin 421 projected from the stopper 419 is inserted. The upper arm part 413d of the actuating member 413 is formed with a projection 416 for stopping one end of a driving wire 423 to be described hereinafter. In addition, a cam plate 417 for pushing the stopper 419 toward the upper link arm 403 is attached to the central portion of the actuating member 413. A coil spring 418 is stretched between an lower portion of the upper frame 401 and a middle portion of the upper arm part 413d so as to bias the actuating member 413 in the counterclockwise direction.

The cam plate 417 of the actuating member 413 is mounted so as to contact the stopper 419 at its cam surface. The stopper 419 is pivotally mounted on the upper link arm 403 in its upper portion through a spindle 420 projected from the upper link arm 403. The guide pin 421 projects from the lower portion of the stopper 419 and engages the wall of the guide opening 415 of the plate-form part 413c.

On the opposite side to the cam plate 417, the stopper 419 has the teeth part 422 to be engaged with either the first or second tooth part 403a or 403b of the upper link arm 403. The cam plate 417 of the actuating member 413 pushes the upper link arm 403 as the teeth part 422 of the stopper 419 engage first the first tooth part 403a and then the second tooth part 403b.

To the projection 416 of the plate-form part 413c, one end of the driving wire 423 is connected. The other end of the driving wire 423 is extended to a lock mechanism 424 equipped on the other upper frame 401' through the upper frame 401 provided with the tilt-up mechanism 4, as shown in FIG. 4. This lock mechanism 424 can lock the tilt-up mechanism 4 when the whole seat is in the normal position and can unlock the tilt-up mechanism 4 like the adjustment knob 408 does.

Figure 5:
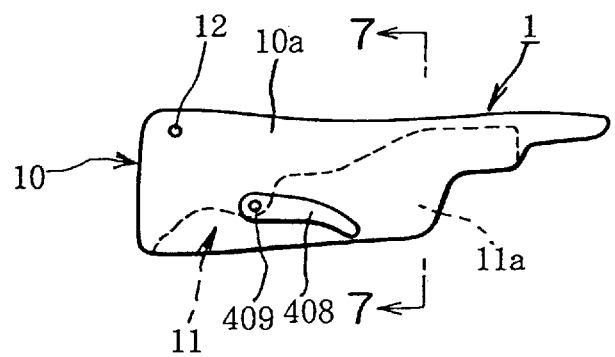
FIG. 5 is a side view of a base cover to be equipped in the tilt-up automobile seat of the present invention in the normal position of the whole seat.

The tilt-up mechanism 4 is contained within the base cover 1, as described above. The base cover 1 is constituted by an upper cover 10 and an under cover 11, as shown in FIG. 5. The upper cover 10 covers the upper side of the tilt-up mechanism 4 such as the upper frame 401, the upper link arm 403 and the like, and the under cover 11 contains the lower side of the tilt-up mechanism 4 such as the lower frame 400, the lower link arm 404 and the like.

The operating shaft 409 of the tilt-up mechanism 4 projects outside through the side of the upper cover 10 and the adjustment knob 408 is fitted on the tip of the operating shaft 409. The upper cover 10 is supported by a pivot 12 projected from an upper front side of the upper frame 401 of the tilt-up mechanism 4 or by the pivot 402 for pivotally connecting the upper and lower frames 401 and 400. As a result, the upper cover 10 along with the upper frame 401 can be tilted upwards around the pivot as the fulcrum. The upper cover 10 covers the under cover 11 so as to wrap the same.

Figure 6:
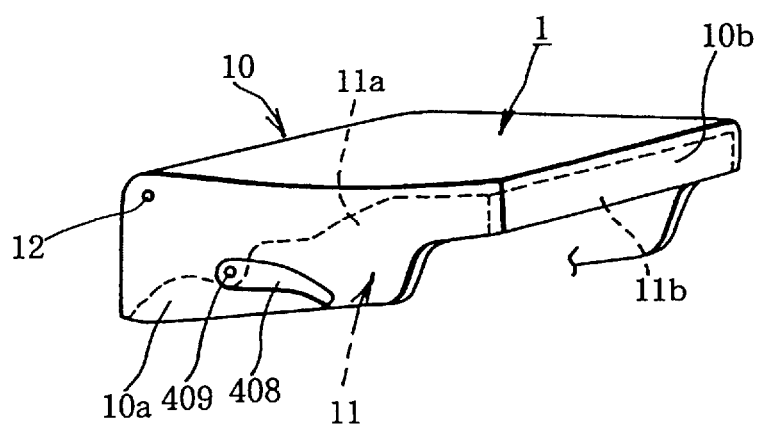
FIG. 6 is a perspective view of an upper cover part, seen from its rear side, of the base cover shown in FIG. 5.
Figure 7:
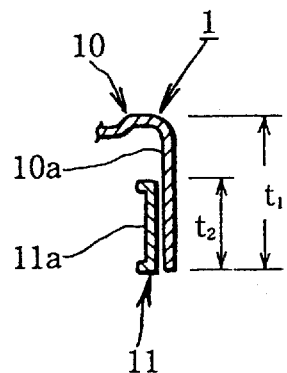
FIG. 7 is a fragmentary cross section, taken along the line 7—7 shown in FIG. 5, of the base cover.
Figure 8:
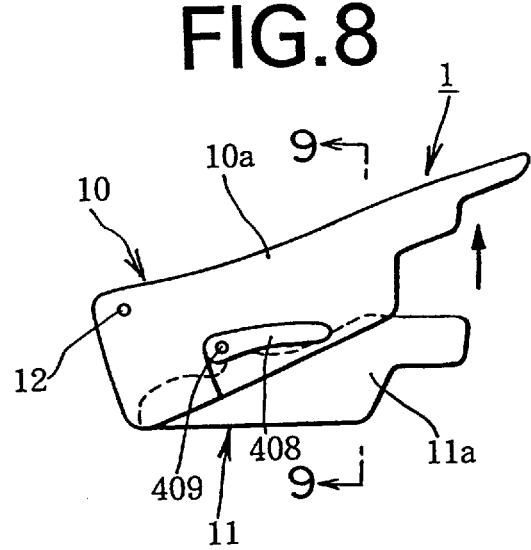
FIG. 8 is a side view showing the base cover when the seat is tilted up.
Figure 9:
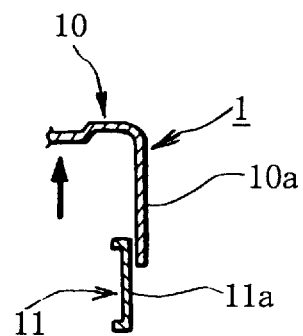
FIG. 9 is a fragmentary cross section, taken along the line 9—9 shown in FIG. 8, of the base cover.

As shown in FIG. 6, the upper cover 10 includes a pair of flange parts 10a extending from its front side ends to both the sides to constitute side walls having a predetermined height so as to cover the under cover 11 sufficiently even when the upper cover 10 is tilted upwards. The under cover 11 is provided with a pair of flange parts 11a standing from its bottom sides so as to constitute side walls having a predetermined height. As shown in FIGS. 7 to 9, these flange parts 10a and 11a have predetermined heights t1 and t2, respectively, so that the flange parts 10a and 11a may overlap with each other even when the whole seat is tilted upwards.

Figure 10:
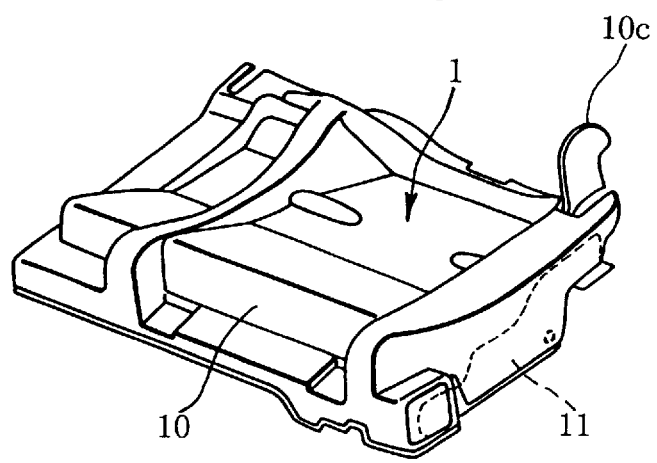
FIG. 10 is a perspective view at a depression angle, showing another base cover.

Similarly, the upper cover 10 and the under cover 11 can further include rear flange parts 10b and 11b having predetermined heights, respectively. When a body panel or the like is mounted on the back of the rear seat, it is unnecessary to provide such rear flange parts 10b and 11b. Further, the upper cover 10 is integrally provided with a stand cover 10c to cover the internal side of the bracket plates for supporting the foregoing reclining mechanism, as shown in FIG. 10.

The tilt-up automobile seat constructed as described above, as shown in FIG. 4, can be installed on the body floor by leg members 400a and 400b extending in front and rear of the under cover 11 from the lower frame 400. When the whole seat is in the normal position, as shown in FIG. 2, the upper and lower link arms 403 and 404 are folded and the teeth part 422 of the stopper 419 engages with the first tooth part 403a of the upper link arm 403. Hence, the whole tilt-up mechanism 4 is completely contained within the base cover 1 without being seen from the outside.

The operation of the aforementioned tilt-up mechanism 4 will be described with reference to FIGS. 11 to 15.

Figure 11:
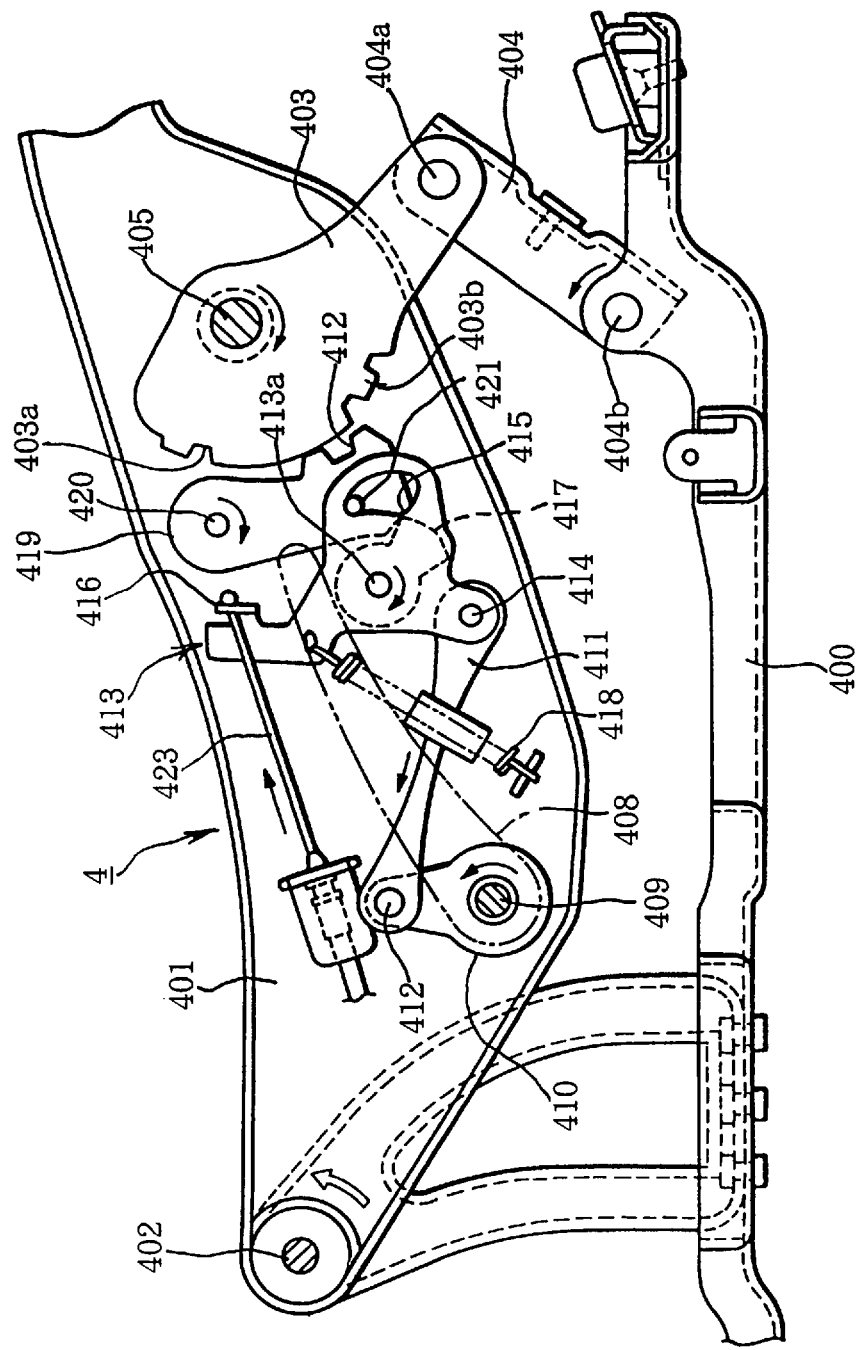
FIG. 11 is a side view of the tilt-up mechanism shown in FIG. 2 for explaining its operation.

From the normal position of the whole seat, the seat back 3 is tilted backwards by operating the reclining mechanism and the adjustment knob 408 is pivoted upwards. At the same time, as shown in FIG. 11, the operating shaft 409 is pivoted along with the eccentric plate 410 to pull the connecting rod 411, resulting in pivoting the actuating member 413 clockwise against the biasing force of the coil spring 418.

As the actuating member 413 is pivoted clockwise, the guide pin 421 of the stopper 419 is guided by the wall of the guide opening 415 of the actuating member 413. The stopper 419 is pivoted away from the upper link arm 403, and the upper link arm 403 starts to extend from its folded position. The teeth part 422 of the stopper 419 is disengaged from the first tooth part 403a of the upper link arm 403.

When the teeth part 422 of the stopper 419 is disengaged from the first tooth part 403a of the upper link arm 403, the clockwise pivoting force is given to the axle 405 of the upper link arm 403 by the biasing force of the coil spring 407, and the upper and lower link arms 403 and 404 are extended or opened from their folded positions. Since an operator lifts the upper cover 10 to perform the operation, the upper side of the tilt-up mechanism 4 can be tilted upwards along with the upper cover 10 around the pivot 402 as the fulcrum.

Figure 12:
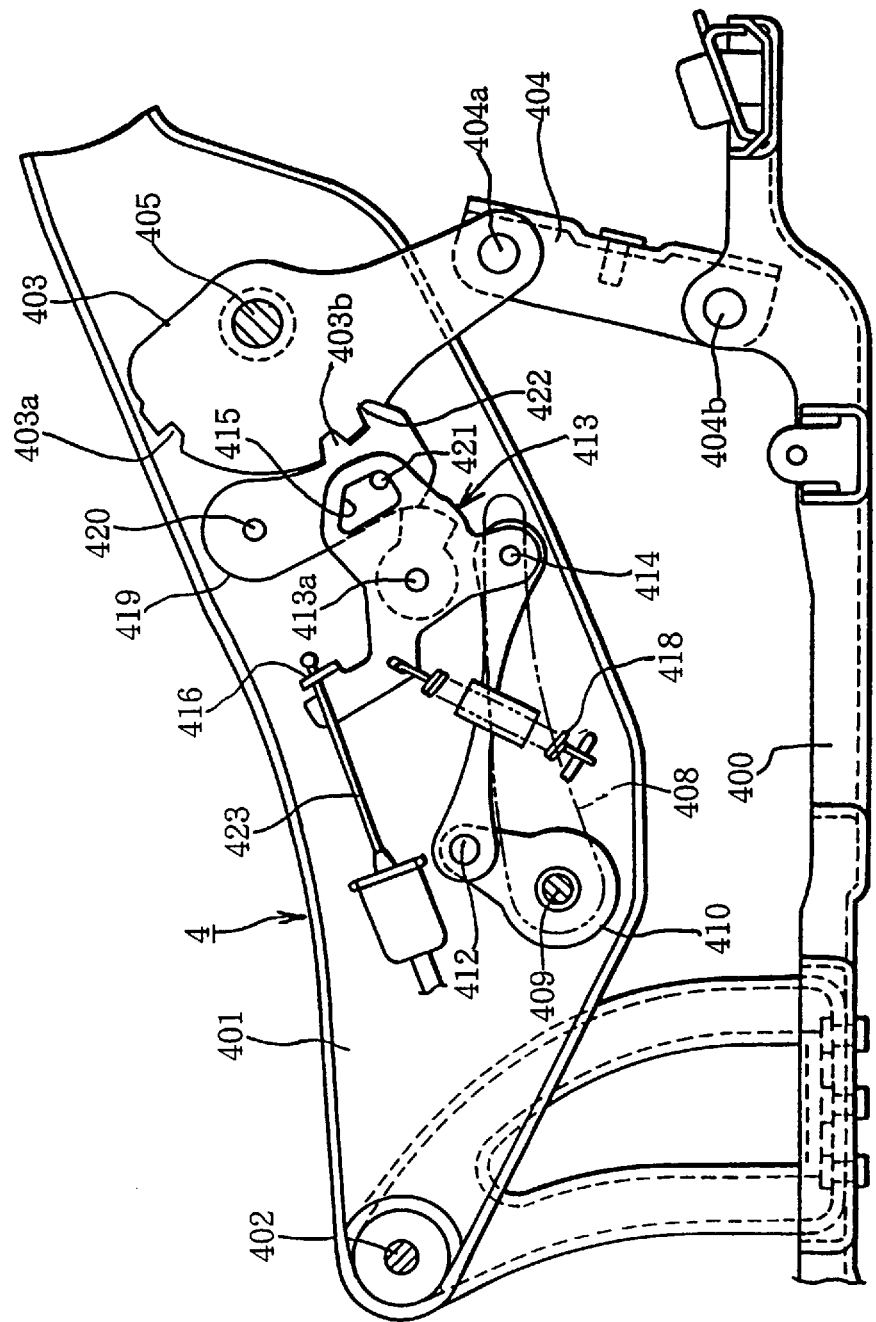
FIG. 12 is a side view of the tilt-up mechanism shown in FIG. 2 when the whole seat is tilted up.
Figure 13:
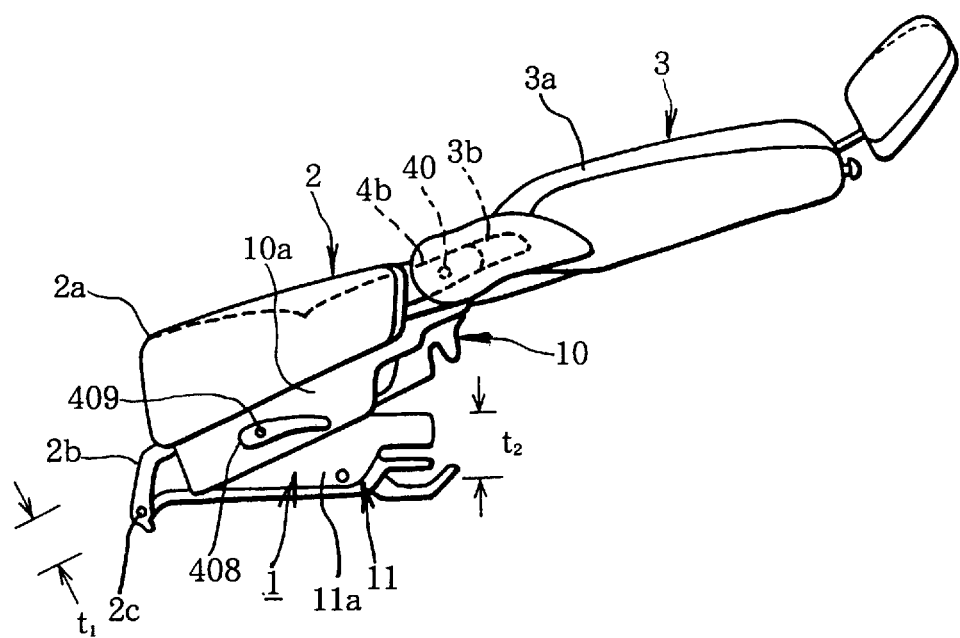
FIG. 13 is a side view of the tilt-up automobile seat of the present invention when the whole seat is tilted up.

With tilting the upper side of the tilt-up mechanism 4 upwards, as shown in FIG. 12, the upper and lower link arms 403 and 404 are opened or extended to a predetermined position. At this time, the actuating member 413 is rushed in the counterclockwise direction by the coil spring 418, and the cam plate 417 of the actuating member 413 pushes the stopper 419. The teeth part 422 of the stopper 419 engages the second tooth part 403b of the upper link arm 403 opened to the predetermined position. Hence, as shown in FIG. 13, while the seat cushion 2 and the seat back 3 are positioned in the flat plane at a predetermined angle, the whole seat is tilted upwards around the front side of the seat cushion 2 as the fulcrum.

With tilting the whole seat upwards, the upper cover 10 is also tilted upwards along with the seat cushion 2, and the upper cover 10 and the under cover 11 are overlapped with each other at least in their side flange parts 10a and 11a with no gap therebetween. As a result, the tilt-up mechanism 4 can be prevented from being seen from the seat side part to keep good appearance of the seat as a whole.

When the tilting of the tilt-up mechanism 4 is released, the adjustment knob 408 is pivoted upwards in the same manner as described above to disengage the teeth part 422 of the stopper 419 from the second tooth part 403b of the upper link arm 403 via the actuating member 413 and the guide pin 421. The operator then pushes down the seat cushion 2 against the biasing force of the coil spring 407 so as to restore the whole seat including the tilt-up mechanism 4 to its normal position.

Figure 14:
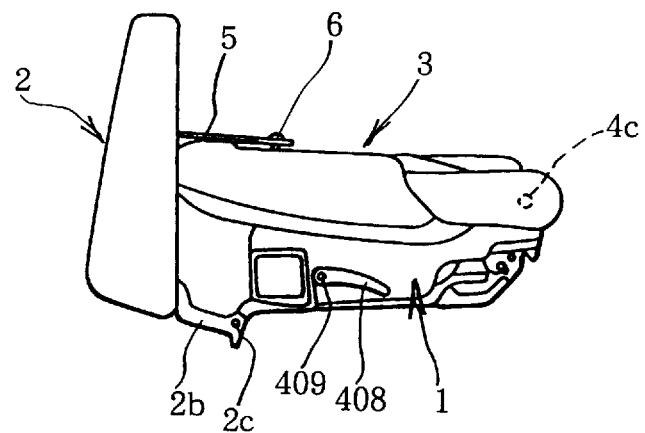
FIG. 14 is a perspective view of the tilt-up automobile seat of the present invention in its folded position.

The automobile seat can be constructed in a collapsible type capable of largely saving its own admitted space in addition to a tilt-up type. When collapsing this seat, as shown in FIG. 14, the seat cushion 2 is pivoted upwards from the base cover 1 to the stand position around the spindle 2c of the bracket arm 2b as the fulcrum and the seat back 3 is folded down onto an upper surface of the upper cover 10 of the base cover 1. By fastening a strap 5 connected on the bottom of the seat cushion 2 onto a stop pin 6 attached on the back of the seat back 3, the seat cushion 2 and the seat back 3 are stably held to their folded position.

Figure 15:
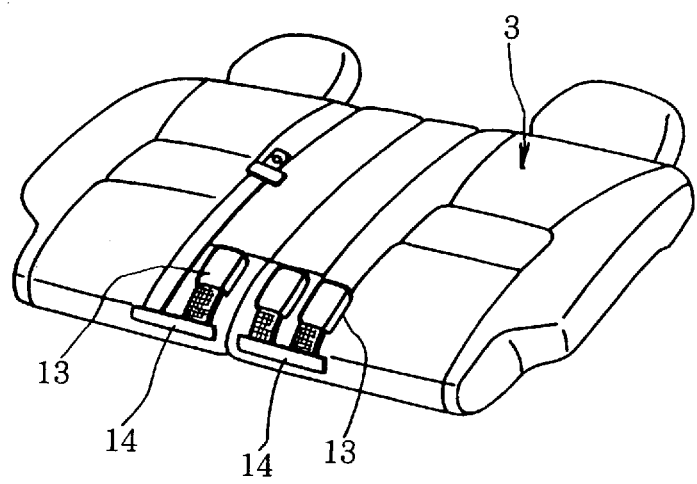
FIG. 15 is a perspective view showing the seat back of the tilt-up automobile seat of the present invention.

As regards seat belts, as shown in FIGS. 3 and 4, buckle 13 can be connected to the upper side of the tilt-up mechanism 4 and be drawn to the seat surface from the slit between the seat cushion 2 and the seat back 3. As shown in FIG. 15, the buckle 13 are coupled with bands 14 provided on the lower side of the seat back 3 so as to prevent the buckles from dropping to the seat cushion side and to hold the same upwards when tilting the seat upwards.

In the foregoing tilt-up mechanism, a slide guide mechanism can be provided to the leg members 400a and 400b of the lower frame 400 via the under cover 11 of the base cover 1 and the whole seat can be movably mounted on the body floor using the slide guide mechanism, resulting in adjusting its position.

According to the present invention, as described above, in a tilt-up automobile seat, even when a whole seat is tilted upwards, a tilt-up mechanism can be contained within a base cover composed of an upper cover and an under cover. As a result, the tilt-up mechanism can be prevented from being seen from the outside to hold good appearance of the seat.

Further, in the tilt-up automobile seat, the tilt-up mechanism can be completely covered by an upper cover having side flange parts and an under cover having side flange parts and these flange parts are always overlapped to each other even when the whole seat is tilted upwards. As a result, a base cover can be readily assembled so that the tilt-up mechanism cannot be seen from the outside.

Although the present invention has been described in its preferred embodiments with reference to the accompanying drawings, it readily understood that the present invention is not restricted to the preferred embodiments and that various changes and modifications can be made by those skilled in the art without departing from the spirit and scope of the present invention.

What is claimed is:

1. A tilt-up automobile seat comprising:

a seat cushion;

a seat back;

tilt-up means positioned under said seat cushion for tilting said seat cushion and said seat back upwardly around a pivot at the front side of said seat cushion;

an upper cover covering an upper part of the tilt-up means and attached to the upper part of the tilt-up means for movement therewith; and an under cover covering a lower part of the tilt-up means, said upper cover and said under cover having mutually overlapping portions such that the tilt-up means is covered by the upper and under covers so as to be invisible when the tilt-up automobile seat is in a normal position in which said seat is not tilted upwards and the tilt-up means remains covered by the upper and under covers so as to be invisible when the tilt-up automobile seat is tilted upwards.

2. A tilt-up automobile seat of claim 1, wherein the upper cover includes first flange parts having a first predetermined height, and the under cover includes second flange parts having a second predetermined height, and wherein the first flange parts and the second flange parts are always overlapped to each other so as to cover the tilt-up means by a combination of the upper and under covers even when the tilt-up automobile seat is tilted upwards.

3. A tilt-up automobile seat as set forth in claim 1, wherein said upper cover has an upper surface for receiving said seat back thereon when said tilt-up automobile seat is folded into a collapsed position.

* * * * *